(12) United States Patent
Wiley et al.

(10) Patent No.: US 10,421,326 B2
(45) Date of Patent: Sep. 24, 2019

(54) DRIVEN PLATFORM WITH TILTING SUSPENSION

(71) Applicant: Facebook, Inc., Menlo Park, CA (US)

(72) Inventors: Scott C. Wiley, Los Altos, CA (US); Michael Epstein, Danville, CA (US)

(73) Assignee: Facebook, Inc., Menlo Park, CA (US)

( * ) Notice: Subject to any disclaimer, the term of this patent is extended or adjusted under 35 U.S.C. 154(b) by 111 days.

(21) Appl. No.: 15/828,365

(22) Filed: Nov. 30, 2017

(65) Prior Publication Data
US 2019/0160902 A1    May 30, 2019

(51) Int. Cl.
| | |
|---|---|
| *B60G 5/04* | (2006.01) |
| *B25J 5/00* | (2006.01) |
| *B60G 13/00* | (2006.01) |
| *B62D 11/08* | (2006.01) |

(52) U.S. Cl.
CPC ............... *B60G 5/04* (2013.01); *B25J 5/007* (2013.01); *B60G 13/003* (2013.01); *B62D 11/08* (2013.01); *B60G 2204/143* (2013.01); *B60G 2206/312* (2013.01); *B60G 2206/41* (2013.01); *B60Y 2200/20* (2013.01); *B60Y 2200/40* (2013.01); *B60Y 2200/44* (2013.01)

(58) Field of Classification Search
CPC .. B60G 5/04; B60G 13/003; B60G 2206/312; B60G 2206/41; B60G 2204/143; B62D 11/08; B25J 5/007; B60Y 2200/20; B60Y 2200/40; B60Y 2200/44
See application file for complete search history.

(56) References Cited

U.S. PATENT DOCUMENTS

| | | | | |
|---|---|---|---|---|
| 5,350,033 | A * | 9/1994 | Kraft .................. | B25J 5/007 180/167 |
| 5,515,934 | A * | 5/1996 | Davis ................. | B25J 5/007 180/15 |
| 8,370,990 | B2 * | 2/2013 | Yu ..................... | B62D 57/028 15/319 |
| 8,496,077 | B2 * | 7/2013 | Nesnas .............. | B25J 5/007 180/7.5 |
| 8,757,309 | B2 * | 6/2014 | Schmitt ............. | B60G 3/28 180/411 |

(Continued)

FOREIGN PATENT DOCUMENTS

| | | | |
|---|---|---|---|
| JP | 62074774 A | * | 4/1987 |
| JP | 2004295429 A | * | 10/2004 |

(Continued)

*Primary Examiner* — Laura Freedman
(74) *Attorney, Agent, or Firm* — FisherBroyles, LLP (57) ABSTRACT

A robotic platform may include left and right platforms, a base platform, wheel assemblies, and a tilting suspension. The tilting suspension may include a tilt shaft coupled to the base platform, a crank, suspension arms, and a tilt assembly. The tilt shaft may extend along a substantially vertical tilt axis. The crank may extend substantially perpendicular to the tilt axis and may be coupled to the tilt shaft such that the crank at least partially rotates about the tilt axis along with the tilt shaft. The suspension arms may extend from the crank to the left and right platforms such that rotation of the crank about the tilt axis controls the tilt of the platforms. The tilt assembly may control rotation of the tilt shaft about the tilt axis to control the tilt of the left and right platforms. Various other systems are also disclosed.

20 Claims, 8 Drawing Sheets

(56) References Cited

U.S. PATENT DOCUMENTS

| | | | | |
|---|---|---|---|---|
| 9,020,639 B2* | 4/2015 | Bewley | ............... | B25J 5/005 |
| | | | | 700/258 |
| 10,059,004 B2* | 8/2018 | Inaba | ............... | B25J 5/005 |
| 10,065,690 B2* | 9/2018 | Summer | ............... | B62D 55/075 |
| 10,207,403 B1* | 2/2019 | Wiley | ............... | B25J 9/162 |
| 10,286,558 B1* | 5/2019 | Asada | ............... | B25J 11/008 |
| 2007/0240928 A1* | 10/2007 | Coltson | ............... | B62D 7/1509 |
| | | | | 180/411 |
| 2018/0169685 A1* | 6/2018 | Taylor | ............... | B05B 12/122 |
| 2018/0330325 A1* | 11/2018 | Sibley | ............... | G05D 1/0225 |

FOREIGN PATENT DOCUMENTS

| | | | |
|---|---|---|---|
| JP | 2010094802 A | * | 4/2010 |
| JP | 2015070981 A | * | 4/2015 |

* cited by examiner

DRIVEN PLATFORM WITH TILTING SUSPENSION

BACKGROUND

Robots have found use in a nearly unlimited number of applications, from mapping and exploring unknown terrain, to performing rescue missions in extreme environmental conditions, to managing data centers, among a host of other scenarios. Robots are often mounted to a platform that supports the robot on a floor or other surface. Wheels may be mounted to the platform to enable rolling or otherwise linear movement of the robot in a generally horizontal direction. Some robotic platforms may even have wheels that are powered or driven. For example, a power assembly (such as an electric motor) may control the rotation of a wheel's axle, which may in turn control rotation of the wheel thereabout to move the robot. Some powered or driven wheels may also include brake assemblies designed to retard rotation of the axle and thus slow or stop rotation of the wheel. Traditionally, at least a portion of this power assembly (e.g., the motor, electrical cabling, etc.), as well as the brake, are disposed within the circumference of the wheel, near the wheel hub, and adjacent to the axle.

The placement of a power or brake assembly within the circumference of a wheel, however, can lead to various disadvantages. For example, when a component of a power or brake assembly is disposed within the circumference of the wheel, this component may be exposed to whatever conditions the wheel moves through. This is particularly problematic for robots or other vehicles that are intended to move through treacherous conditions or water.

In addition, when some or all of the power or brake assembly is located within the circumference of the wheel, the electrical wires that provide electricity to the power assembly and/or the brake cabling may limit the maneuverability of the robotic platform since the wheel may be unable to rotate 360 degrees without becoming entangled. This is especially disadvantageous for robots intended to perform highly maneuverable functions.

Positioning some or all of the power assembly within the circumference of the wheel may also lead to an increased risk of damage to the power assembly. For instance, when a driven wheel is part of a robot or other object that is susceptible to falling or being dropped, the power assembly may be damaged by such forceful impacts. Similar issues arise when positioning brake assemblies within the circumference of a wheel.

Moreover, robots that employ driven or powered wheels often have difficultly navigating difficult terrain, such as damaged or uneven surfaces with holes, bumps, or ridges. For example, a robot driven by traditional caster wheels may tip over when traversing an especially uneven surface (or simply be unable to traverse such a surface), potentially damaging the robot's sensitive componentry or impeding the robot's mission.

As such, the instant disclosure identifies and addresses a need for improved robotic platforms and related vehicles.

SUMMARY

As will be described in greater detail below, the instant disclosure describes various robotic platforms and assemblies. In one example, a robotic platform may include a chassis, a wheel assembly, and a tilting suspension system. The chassis may include at least one left platform, at least one right platform, and at least one base platform. The wheel assembly may be mounted on each of the left and right platforms. The tilting suspension system may include a tilt shaft an arm crank, left and right suspension arms, and a tilt assembly. The tilt shaft may be coupled to the base platform and extend from a first tilt shaft end to a second tilt shaft end along a substantially vertical tilt axis. The arm crank may (1) extend substantially perpendicular to the tilt axis from a left arm crank end to a right arm crank end and (2) couple to the second tilt shaft end such that the arm crank at least partially rotates about the tilt axis along with the tilt shaft. The left and right suspension arms may be coupled to the left and right arm crank ends, respectively and extend from the left and right arm crank ends, respectively, to connect to the left and right platforms, respectively, such that rotation of the arm crank about the tilt axis controls tilt of the left and right platforms relative to the tilt axis. Finally, the tilt assembly may control rotation of the tilt shaft about the tilt axis to control the rotation of the arm crank and the tilt of the left and right platforms.

In some examples, the tilt assembly may include a tilt motor and a tilt belt that is controlled by the tilt motor. In these examples, the tilt shaft may be wrapped by the tilt belt such that rotation of the tilt belt controls rotation of the tilt shaft about the tilt axis.

The robotic platform may also include a tilt brake arranged on the second tilt shaft end and dimensioned to retard motion of the tilt shaft to thereby retard motion of the arm crank and the left and right suspension arms. The tilt brake may be a disc brake that includes (1) a disc disposed on the tilt shaft and configured to rotate with the tilt shaft about the tilt axis and (2) a pair of pads, on top and bottom sides of the disc, that are compressible against the disc to retard rotation of the disc and thereby retard rotation of the tilt shaft.

The robotic platform may also include a drive assembly disposed on each of the left and right platforms. Each drive assembly may include a drive motor and a drive belt that is controlled by the drive motor.

In some examples, each wheel assembly may include (1) a wheel mounted to an axle for rotation about a drive axis and steering about a substantially vertical steering axis, (2) a drive shaft extending along the steering axis from a first drive shaft end to a second drive shaft end, with the first drive shaft end being coupled to the axle and the second drive shaft end being wrapped by the drive belt of the drive motor such that the drive belt controls rotation of the drive shaft about the steering axis, and (3) a bevel gear connecting the first drive shaft end to the axle such that rotation of the drive shaft about the steering axis controls rotation of the wheel about the drive axis to drive the robotic platform in a substantially horizontal direction.

The robotic platform may also include a steer assembly disposed on each of the left and right platforms. This steer assembly may include a steer motor and a steer belt, and the wheel assembly may include a steer shaft extending along the steering axis from a first steer shaft end to a second steer shaft end. The first steer shaft end may be coupled to the axle and the second steer shaft end may be wrapped by the steer belt such that the steer belt controls rotation of the steer shaft about the steering axis to steer the wheel about the steering axis.

In one example, the robotic platform may also include a brake arranged on the second drive shaft end of the drive shaft and dimensioned to retard motion of the drive shaft and thereby retard motion of the wheel. In this example, the brake may include a disc brake that includes (1) a disc disposed on the drive shaft and configured to rotate with the drive shaft about the steering axis and (2) a pair of pads, on top and bottom sides of the disc, that are compressible against the disc to retard rotation of the disc and thereby retard rotation of the drive shaft.

In some examples, the drive axis and the steering axis may together form an oblique angle such that the wheel is tilted relative to the drive shaft. In addition, the tilt assembly may be configured to tilt each of the left and right platforms at an angle that is substantially equal to the tilt of the wheel such that the drive axis is substantially perpendicular to the tilt axis. Moreover, each wheel may be configured to freely rotate 360 degrees about the steering axis.

In one example, the robotic platform may also include a drive assembly disposed on the base platform and a base driven wheel assembly mounted on the base platform. The drive assembly may include a base drive motor and a base drive belt. The base driven wheel assembly may include (1) a wheel mounted to an axle for rotation about a drive axis and steering about a substantially vertical steering axis, (2) a drive shaft extending along the steering axis from a first drive shaft end to a second drive shaft end, with the first drive shaft end being coupled to the axle and the second drive shaft end being wrapped by the base drive belt such that the base drive belt controls rotation of the drive shaft about the steering axis, and (3) a bevel gear connecting the first drive shaft end to the axle such that rotation of the drive shaft about the steering axis controls rotation of the wheel about the drive axis to drive the robotic platform in a substantially horizontal direction.

In addition, a corresponding vehicle may include a chassis, a wheel assembly, and a tilting suspension system. The chassis may include at least one left platform, at least one right platform, and at least one base platform. The wheel assembly may be mounted on each of the left and right platforms. In addition, the tilting suspension system may include (1) a tilt shaft, coupled to the base platform, that extends from a first tilt shaft end to a second tilt shaft end along a substantially vertical tilt axis, (2) an arm crank extending substantially perpendicular to the tilt axis from a left arm crank end to a right arm crank end, where the arm crank is coupled to the second tilt shaft end such that the arm crank at least partially rotates about the tilt axis along with the tilt shaft, (3) left and right suspension arms coupled to the left and right arm crank ends, respectively, with the left and right suspension arms extending from the left and right arm crank ends, respectively, to connect to the left and right platforms, respectively, such that rotation of the arm crank about the tilt axis controls the tilt of the left and right platforms relative to the tilt axis, and (4) a tilt assembly that controls rotation of the tilt shaft about the tilt axis to control the rotation of the arm crank and the tilt of the left and right platforms.

In some examples, the tilt assembly may include a tilt motor and a tilt belt that is controlled by the tilt motor. In addition, the tilt shaft may be wrapped by the tilt belt such that rotation of the tilt belt controls rotation of the tilt shaft about the tilt axis. The vehicle may also include a drive assembly disposed on each of the left and right platforms, with the drive assembly including a drive motor and a drive belt that is controlled by the drive motor. In this example, the wheel assembly may include (1) a wheel mounted to an axle for rotation about a drive axis and steering about a substantially vertical steering axis, (2) a drive shaft extending along the steering axis from a first drive shaft end to a second drive shaft end, with the first drive shaft end being coupled to the axle and the second drive shaft end being wrapped by the drive belt such that the drive belt controls rotation of the drive shaft about the steering axis, and (3) a bevel gear connecting the first drive shaft end to the axle such that rotation of the drive shaft about the steering axis controls rotation of the wheel about the drive axis to drive the vehicle in a substantially horizontal direction.

In one example, the vehicle may include a tilt disc brake arranged on the second tilt shaft end of the tilt shaft and dimensioned to retard motion of the tilt shaft and thereby retard motion of the arm crank and the left and right suspension arms. In this example, tilt disc brake may include (1) a disc disposed on the tilt shaft and configured to rotate with the tilt shaft about the tilt axis and (2) a pair of pads, on top and bottom sides of the disc, that are compressible against the disc to retard rotation of the disc and thereby retard rotation of the tilt shaft.

In some examples, the vehicle may include a second left platform and a second right platform. In these examples, the wheel assembly may be mounted on each of the second left and second right platforms, the left and right platforms may be disposed proximate a fore end of the base platform, and the second left and second right platforms may be disposed proximate an aft end of the base platform. The vehicle may also include a second tilting suspension system that includes (1) a second tilt shaft having a second tilt shaft bottom end coupled to the base platform and extending from the second tilt shaft bottom end to a second tilt shaft top end along a second substantially vertical tilt axis, (2) a second arm crank extending substantially perpendicular to the second tilt axis from a left end to a right end of the second arm crank, where the second arm crank is coupled to the second tilt shaft top end such that the second arm crank at least partially rotates about the second tilt axis along with the second tilt shaft, (3) left and right second suspension arms coupled to the left and right ends of the second arm crank, respectively, with the left and right second suspension arms extending from the left and right ends of the second arm crank, respectively to connect to the second left and second right platforms, respectively, such that rotation of the second arm crank about the second tilt axis controls tilt of the second left and second right platforms relative to the second tilt axis, and (4) an extension arm that couples the arm crank to the second arm crank such that rotation of the arm crank about shaft controls rotation of the second arm crank about the second tilt shaft to control the rotation of the second arm crank and the tilt of the second left and second right platforms.

In another example, a robotic platform may include a chassis, a wheel assembly, and a tilting suspension system. The chassis may include a left-fore platform, a right-fore platform, a left-aft platform, a right-aft platform, and a base platform. The wheel assembly may be mounted on each of the left-fore, right-fore, left-aft and right-aft platforms. The tilting suspension system may include (1) fore and aft tilt shafts mounted to fore and aft ends of the base platform, respectively, where each of the fore and aft tilt shafts extends from a first tilt shaft end to a second tilt shaft end along a substantially vertical tilt axis, (2) fore and aft arm cranks coupled to the second tilt shaft end of the fore and aft tilt shafts, respectively, such that, for each arm crank, the arm crank at least partially rotates about the tilt axis and the arm crank extends substantially perpendicular to the tilt axis from a left arm crank end to a right arm crank end, and (3) for each of the fore and aft arm cranks, left and right suspension arms connected to the left and right arm crank ends, respectively. The left and right suspension arms connected to the fore arm crank may be coupled to the left-fore and right-fore platforms, respectively, such that rotation of the fore arm crank along with the fore tilt shaft controls tilt of the left-fore and right-fore platforms relative to the tilt axis of the fore tilt shaft. In addition, the left and right suspension arms connected to the aft arm crank may be coupled to the left-aft and right-aft platforms, respectively, such that rotation of the aft arm crank along with the aft tilt shaft controls tilt of the left-aft and right-aft platforms relative to the tilt axis of the aft tilt shaft. In this example, the tilt suspension system may also include a tilt assembly including a tilt motor and a tilt belt that is controlled by the tilt motor, where the fore tilt shaft is wrapped by the tilt belt such that rotation of the tilt belt controls rotation of the fore tilt shaft to control the tilt of the left-fore and right-fore platforms. The titling suspension system may also include an extension arm that couples the fore arm crank to the aft arm crank such that rotation of the fore arm crank about the fore tilt shaft controls rotation of the aft arm crank about the aft tilt shaft to control the tilt of the left-aft and right-aft platforms.

In some examples, the robotic platform may also include a drive assembly disposed on each of the left-fore, right-fore, left-aft, and right-aft platforms. The drive assembly may include a drive motor and a drive belt that is controlled by the drive motor. In these examples, the wheel assembly may include (1) a wheel mounted to an axle for rotation about a drive axis and steering about a substantially vertical steering axis, (2) a drive shaft extending along the steering axis from a first drive shaft end to a second drive shaft end, with the first drive shaft end being coupled to the axle and the second drive shaft end being wrapped by the drive belt such that the drive belt controls rotation of the drive shaft about the steering axis, and (3) a bevel gear connecting the first drive shaft end to the axle such that rotation of the drive shaft about the steering axis controls rotation of the wheel about the drive axis to drive the robotic platform in a substantially horizontal direction.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to robotic platforms with driven wheel assemblies and titling suspension systems. As will be explained in greater detail below, embodiments of the instant disclosure may include a robotic platform having driven (or powered) wheels mounted on discrete platforms of a chassis. The wheels may be driven by a power assembly (which may include both a drive assembly and a steering assembly) via a drive shaft and bevel gear arrangement. The power assembly may drive rotation of its respective wheel about an axle to move the robotic platform in a substantially horizontal direction, while the wheel may be steerable via a steer shaft that extends along a substantially vertical steering axis. The power assembly may be connected to one end of the drive shaft to control its rotation about the steering axis. The other end of the drive shaft may be connected to the wheel axle via a bevel gear. The drive shaft may extend from the axle to a location above the wheel where it connects to the power assembly. A tilting suspension system may control the tilt of the chassis' discrete platforms to improve the steering and driving capabilities of the robotic platform.

Since the entire power assembly may be located distally from the wheel, components of the power assembly may be protected, for example, from environmental conditions that may surround the wheel. This may be particularly advantageous for robotic platforms intended to move through extreme weather conditions or through water. In addition, the wheel assemblies disclosed herein may allow each wheel to freely rotate 360 degrees about its steering axis without becoming entangled by electrical wires or other components of the power assembly. Moreover, the disclosed titling suspension system may enable the robotic platform to traverse difficult terrain, may dampen the impact of bumps or obstacles, and/or may enable, when combined with other platforms and seating arrangements, users to perform complex tasks that mimic the movements of a human shoulder.

The following will provide, with reference to FIGS. 1-6, detailed descriptions of a three-wheeled platform with a tilting suspension system that provides improved control and steering capabilities. The description corresponding to FIG. 7 will describe a four-wheeled version of the robotic platform shown in FIGS. 1-6. Finally, the description corresponding to FIG. 8 will detail an exemplary scenario in which the platforms described herein may be used.

Figure 1:
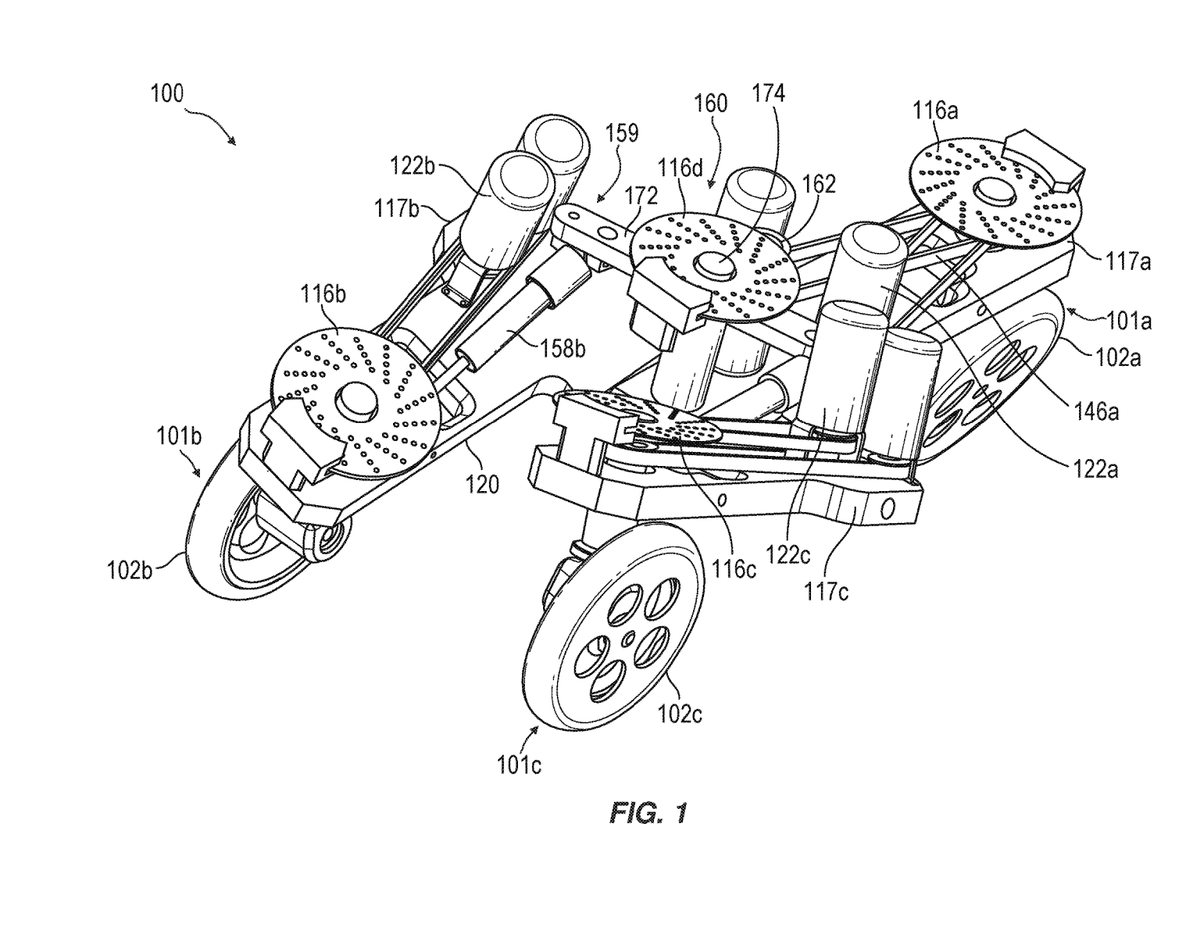
FIG. 1 is a perspective view of a robotic platform according to one embodiment.

FIG. 1 is a perspective view of a robotic platform 100. The robotic platform 100 may include a chassis 120, which may include a base platform 117a, a right platform 117b, and a left platform 117c. Right and left driven wheel assemblies 101b, 101c may be mounted to the right and left platforms 117b, 117c, respectively. As shown in FIG. 5, left and right drive assemblies 106b, 106c may be arranged on the right and left platforms 117b, 117c, to drive (or power) the driven wheel assemblies 101b, 101c. As shown in FIGS. 1-6, in some embodiments a fore wheel assembly 101a may be mounted on the base platform 117a and a drive assembly 106a may be arranged on the base platform 117a to drive the fore wheel assembly 101a. In other embodiments, however, the base platform 117a may not include a driven wheel assembly or drive assembly. For example an idle wheel, or other unpowered wheel or support, may instead be mounted on the base platform 117a.

While the following description at times refers to a single wheel assembly (e.g., fore wheel assembly 101a), the description of fore wheel assembly 101a may also apply to some or all of the other wheel assemblies right and left wheel assemblies 101b, 101c).

Figure 5:
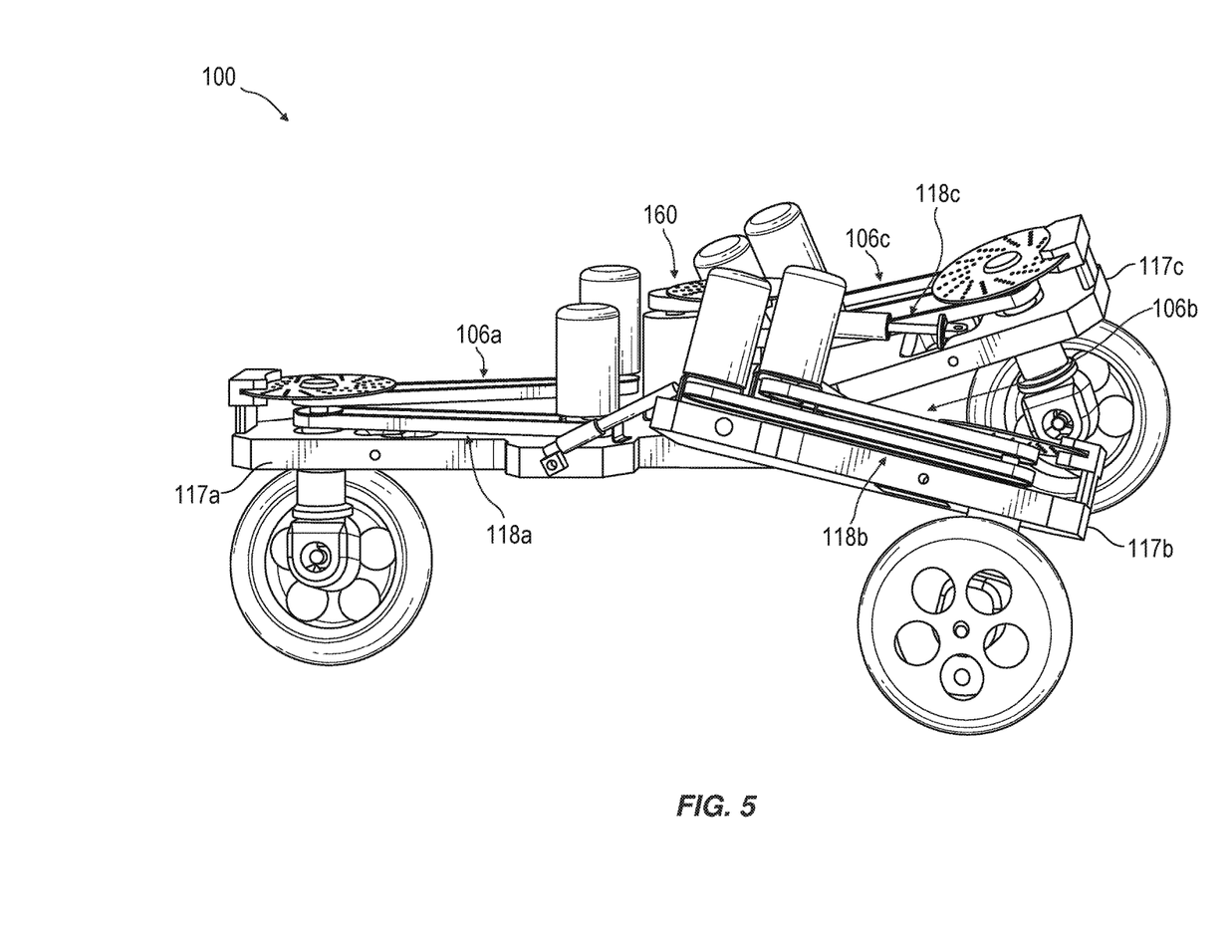
FIG. 5 is a right-side view of the robotic platform of FIG. 1.
Figure 6:
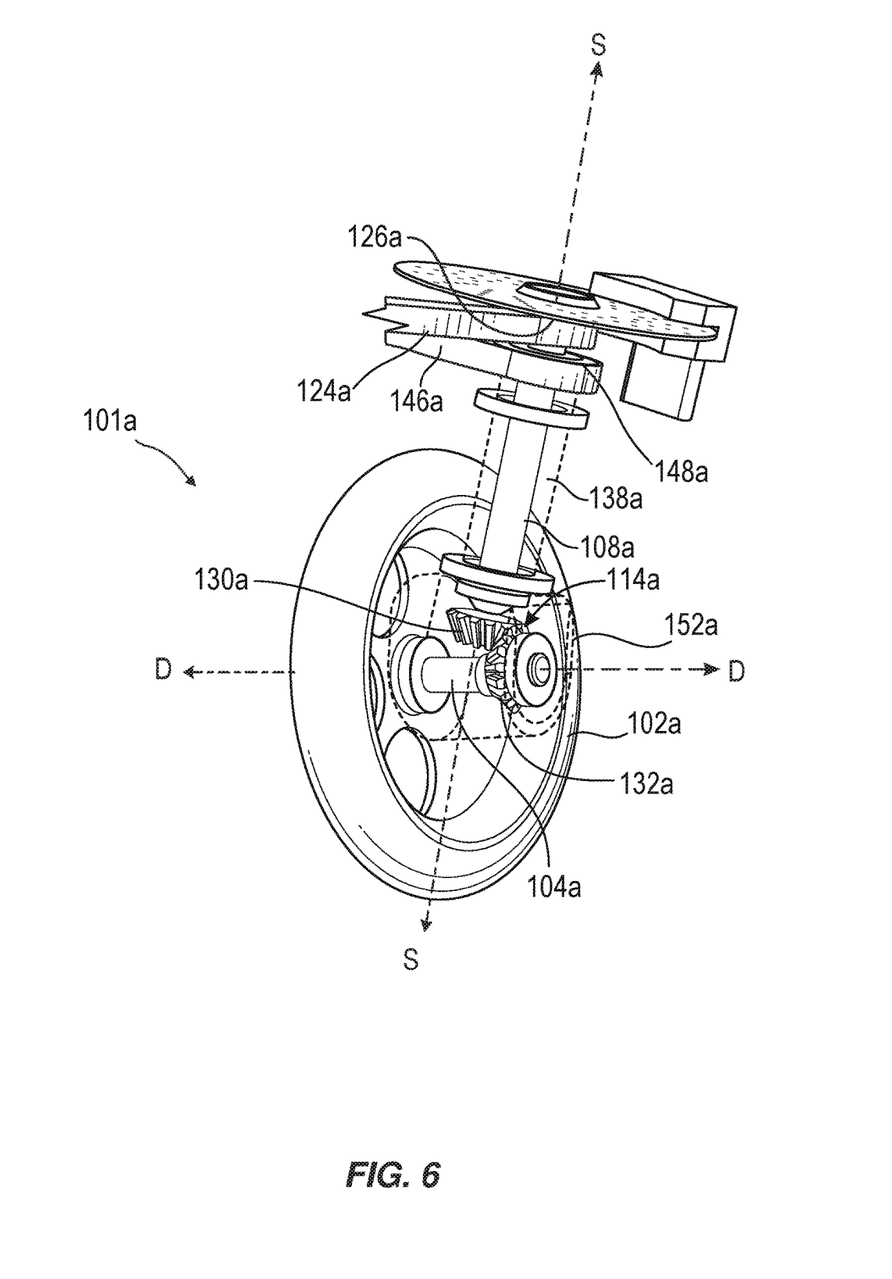
FIG. 6 is a close-up view of a driven wheel assembly of the robotic platform of FIG. 1, with the casting and the drive shaft shown in transparent, and with the chassis removed.

As shown in FIG. 6, the fore wheel assembly 101a may include a wheel 102a mounted to an axle 104a for rotation about a drive axis D and steering about a substantially vertical steering axis S. A drive shaft 108a may extend along the steering axis S from a lower shaft end to an upper shaft end. The lower shaft end may be coupled to the axle 104a, and the upper end may be coupled to a respective drive assembly 106a (see FIGS. 2, 3, and 5) such that the drive assembly 106a controls rotation of the drive shaft 108a about the steering axis S. A bevel gear 114a may connect the drive shaft 108a to the axle 104a to translate torque and power from the drive assembly 106a to the wheel 102a. The bevel gear 114a may connect the lower drive shaft end to the axle such that rotation of the drive shaft about the steering axis S controls rotation of the axle 104a about the drive axis D. As shown in FIG. 5, the entirety of drive assemblies 106a, 106b, 106c may be located above the wheels 102a, 102b, 102c, which may protect the robotic platform 100 from damage. For example, by positioning the components of the power assembly (which may include both a drive assembly and a steering assembly, as detailed below) in this manner, the robotic platform 100 may be able to drive through deep water or survive other environmental conditions.

Figure 4:
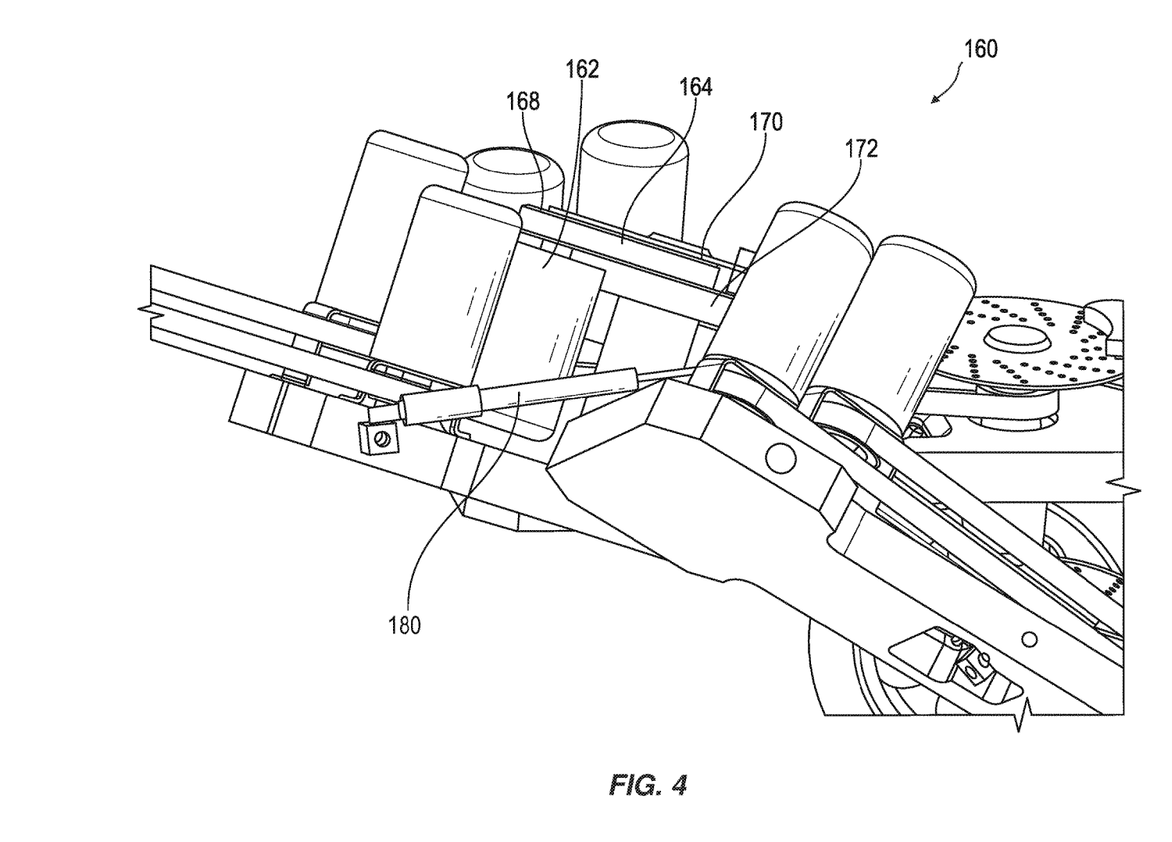
FIG. 4 is a close-up view of a portion of the robotic platform of FIG. 1.

Referring to FIGS. 1, 4, and 5, a tilting suspension system 159 may be provided for improving the control and steering of the robotic platform 100. In one example, the tilting suspension system 159 may control the tilt of the right and left platforms 117b, 117c relative to the base platform 117a. The tilting suspension system 159 may include right and left suspension arms 158b, 158c that may be coupled to (1) the right and left platforms 117b, 117c, respectively, and (2) an arm crank 172. The arm crank 172 may be mounted to a tilt shaft 174 such that, as the tilt shaft rotates about a substantially vertical tilt axis, the arm crank 172 translates this rotational motion to the suspension arms 158b, 158c to tilt the right and left platforms 117b, 117c.

The tilt shaft 174 may extend from a lower end (coupled to the base platform 117a) to an upper end along the substantially vertical tilt axis. The arm crank 172 may be mounted on or proximate to the upper end of the tilt shaft 174. The arm crank 172 may also be coupled to the tilt shaft 174 such that the arm crank 172 rotates about the tilt axis along with the tilt shaft 174. In addition, the arm crank 172 may extend in a plane that is substantially perpendicular to the tilt axis.

As shown in FIG. 4, a tilt assembly 160 may control rotation of the tilt shaft 174 about the tilt axis. The tilt assembly 160 may include a tilt motor 162 that controls the rotation of a tilt motor pulley 168. A tilt belt 164 may wrap around tilt motor pulley 168 and a tilt shaft pulley 170. The tilt belt 164 may rotate along with the tilt motor pulley 168, which may cause rotation of the tilt shaft pulley 170 about the tilt axis. Rotation of the tilt shaft pulley 170 may thus cause the tilt shaft 174 to rotate about the tilt axis. As such, the tilt and suspension of the right and left platforms 117b, 117c may be controlled by the tilting suspension system 159.

Figure 2:
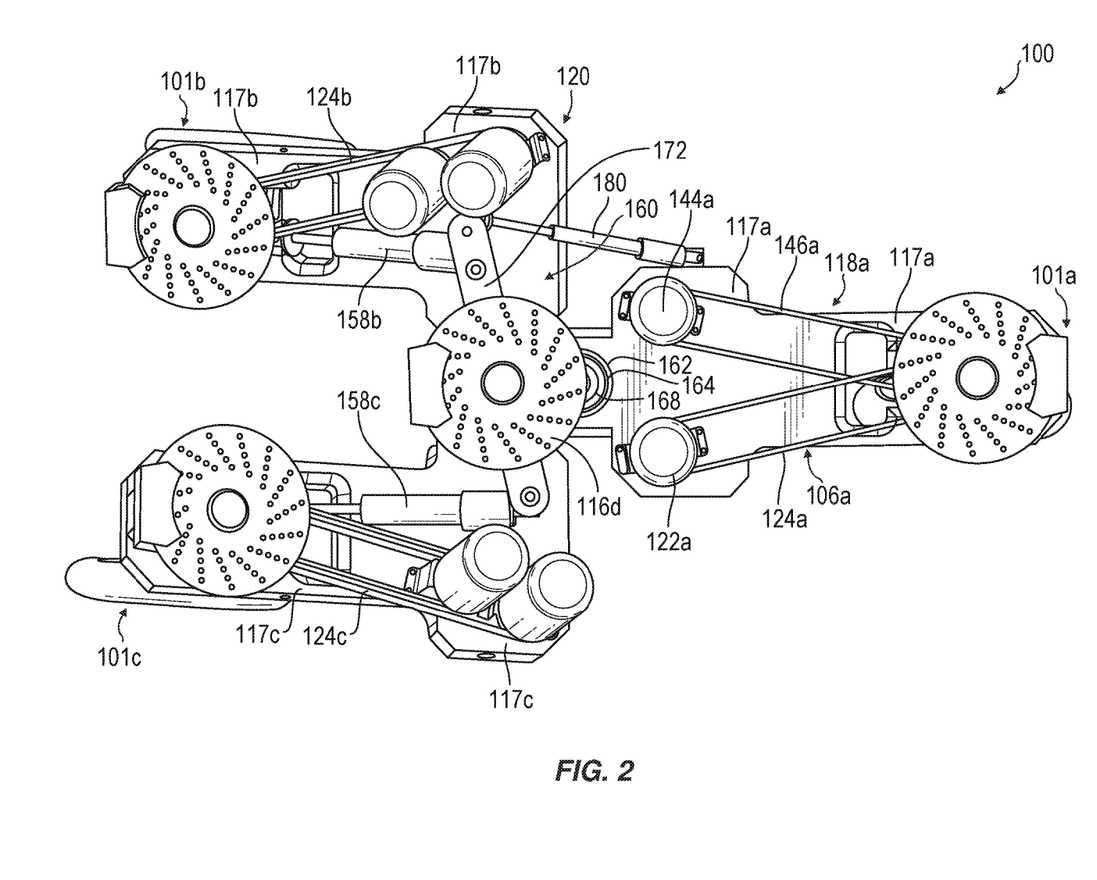
FIG. 2 is a top view of the robotic platform of FIG. 1.

In one example, and as shown in FIGS. 2 and 4, the tilting suspension system 159 may also include at least one steering damper 180. The steering damper 180 generally represents any type or form of device capable of inhibiting an undesirable uncontrolled movement or oscillation of a vehicle steering mechanism. In the disclosed example, the steering damper 180 may be connected to both the base platform 117a and the arm crank 172 to eliminate or reduce oscillation or wobble in steering operations performed by the robotic platform 100.

In addition, while the suspension arms 158b, 158c may be used by the arm crank 172 to transfer motion from the tilt shaft 174 to tilt the right and left platforms 117b, 117c, the suspension arms 158b, 158c may also include one or more shock absorption and/or suspension features designed to improve the handling, ride quality, and/or maneuverability of the robotic platform 100. Together with other components of the titling suspension system 159, the suspension arms 158b, 158c may thus enable the robotic platform 100 to traverse difficult (or otherwise impassable) terrain and/or may dampen the impact of bumps or obstacles. As described in greater detail below, the tilting suspension system 159 may also, when combined with other platforms and seating arrangements, enable users to perform complex tasks that mimic the movements of a human shoulder.

Figure 3:
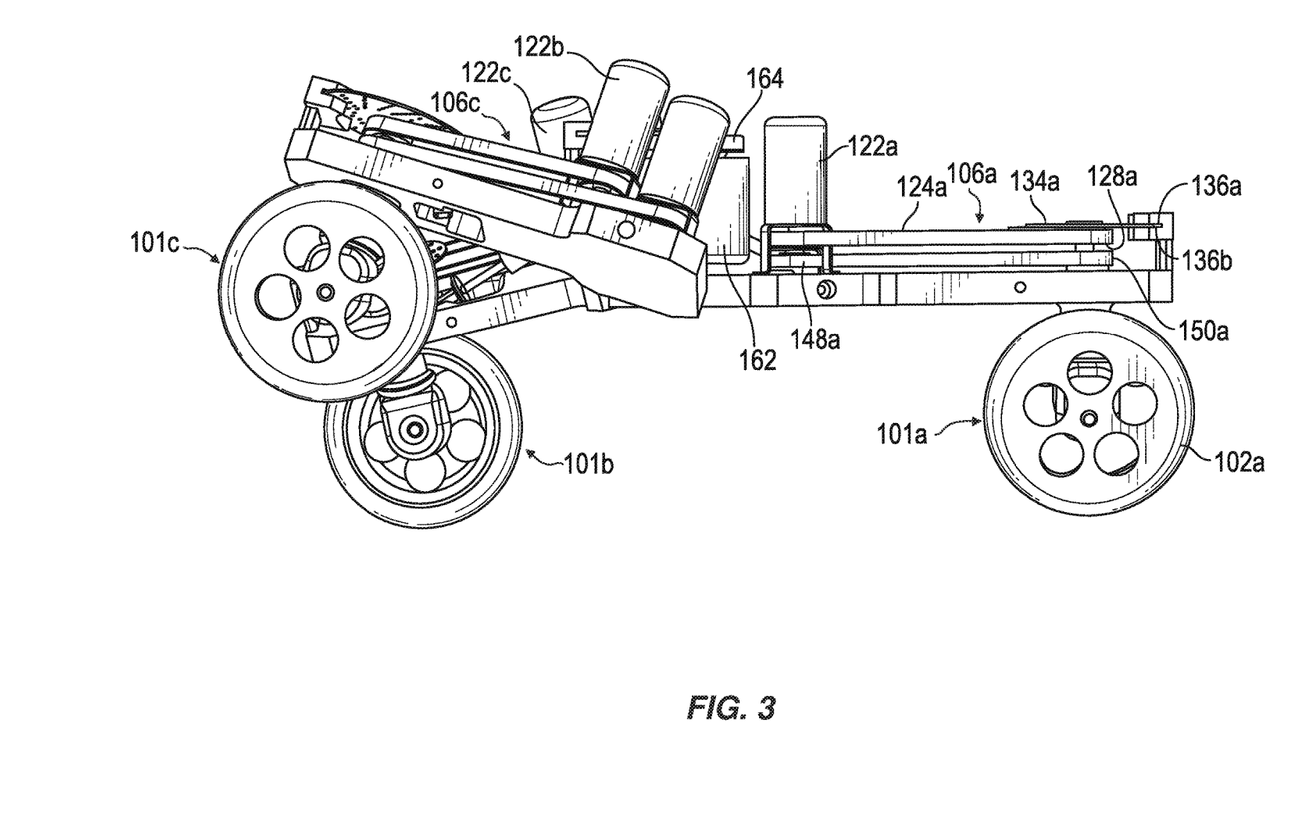
FIG. 3 is a left-side view of the robotic platform of FIG. 1.

As shown in FIGS. 1-3, the drive assemblies 106a, 106b, 106c may each include a drive motor 122a, 122b, 122c. As shown in FIGS. 3 and 6, a drive belt (e.g., drive belt 124a) may rotate about a drive motor pulley 126a and a drive shaft pulley 128a. As such, the wheel assemblies 101a, 101b, 101c may be controlled by a drive shaft pulley (e.g., drive shaft pulley 128a) that is mounted to or integral with a drive shaft (e.g., drive shaft 108a).

In some embodiments, each drive motor may cause its respective drive shaft to rotate about a substantially vertical drive axis D that extends substantially parallel to the steering axis S. For example, and as shown in FIG. 6, drive motor pulley 126a may be mounted to an upper portion of the drive motor 122a, and the drive shaft pulley 128a may be mounted to an upper portion of the drive shaft 108a. The drive belt 124a may extend between the pulleys 126a, 128a and within a plane substantially perpendicular to the drive axis D and steering axis S. Thus, the drive motor 122a may cause the drive motor pulley 126a to move about the drive axis D, which may in turn cause the drive belt 124a to move about the pulleys 126a, 128a, thereby causing the drive shaft pulley 128a and the drive shaft 108a to rotate about their steering axis S. In one example, each drive motor 122a, 122b, 122c may be controlled independently of one another by a controller, resulting in improved steering and control.

As shown in FIG. 6, torque and power generated by the drive motor 122a may be transferred from the drive shaft 108a to the axle 104a via the bevel gear 114a. The drive shaft 108a and axle 104a may function as the shafts of the bevel gear 114a. Mating gears 130a, 132a may be disposed on the lower portion of the drive shaft 108a and axle 104a. Thus, the bevel gear 114a may transfer and change the direction of the power and torque from the drive motor 122a to the wheel 102a. As shown in FIG. 6, the bevel gear 114a may represent a miter gear, and the mating gears 130a, 132a may provide a gear ratio of 1:1. The bevel gear 114 can, however, have other suitable configurations and gear ratios while remaining within the scope of this disclosure. For example, the mating gears 130a, 132a may include any suitable number of teeth. Also, the intersection of the drive and steering axes can form any suitable angle while remaining within the scope of this disclosure.

As described herein, drive power may be provided to the wheel 102a by way of the substantially vertical drive shaft 108a that extends along the side of the wheel 102a from the axle 104a to a location entirely above the wheel (e.g., above chassis 120). As such, the wheel 102a may be able to freely rotate 360 degrees about the steering axis S. This configuration may offer many advantages from a steering and maneuverability standpoint. In addition, the configuration of the drive shaft 108a and the bevel gear 114a may result in a robotic platform 100 that may be free of wires or other electrical components extending close to the wheel 102a. For example, since drive shaft 108a receives power at its upper end, and transfers power to the wheel 102a at its lower end via the bevel gear 114a, the drive belt 124a may be located entirely above the wheel 102a, with all electrical and other drivetrain components disposed distally from the wheel 102a, leaving a simple gearing configuration proximate the wheel 102a.

In some embodiments, a brake 116a, 116b, 116c may be disposed entirely above the wheels 102a, 102b, 102c. The brakes 116a, 116b, 116c may each be disposed on the upper drive shaft end of their respective drive shafts and configured to retard the motion of the same about its steering axis to thereby retard the motion of their respective wheels 102a, 102b, 102c about its drive axis. Any suitable brake configuration may be used. In one example, and as shown in FIG. 3, each brake (e.g., brake 116a) may represent a disc brake, including a disc (e.g., disc 134a) arranged on the upper end of its respective drive shaft (e.g., drive shaft 108a) and configured to rotate about the drive shaft's steering axis along with the drive shaft. In this example, the disc 134a may be mounted to the drive shaft pulley 128a. The disc 134a may have top and bottom surfaces, with each extending in a horizontal plane that is substantially perpendicular to the steering axis of the drive shaft 108a. A retarding mechanism may be provided to retard the motion of the disc 134a. Any suitable type of retarding mechanism may be provided. In one embodiment, the retarding mechanism may include top and bottom pads 136a, 136b disposed proximate the top and bottom surfaces of the disc 134a, respectively. At least one of the pads 136a, 136b may be compressible towards the disc 134a such that the pads 136a, 136b pinch the disc 134a to thereby retard its motion about the steering axis of the drive shaft 108a.

In some embodiments a tilt brake 116d may be disposed on the tilt shaft 174. The tilt brake 116d may be configured to retard the motion of the tilt shaft 174 about its tilt axis to thereby retard movement of the arm crank 172 and, thus, the suspension arms 158b, 158c. In one example, the tilt brake 116d may include a disc brake, which may be configured to operate similarly to the brakes 116a, 116b, 116c described above.

As shown in FIG. 5, in one embodiment a steer assembly (e.g., steer assemblies 118a, 118b, 118c) may be provided to control the steering of each wheel 102a, 102b, 102c about its respective steering axis S. As best shown in FIG. 6, for each wheel assembly (e.g., fore wheel assembly 101a), a steer shaft (e.g., steer shaft 138a) may extend along the steering axis S from a bottom steer shaft end to a top steer shaft end. The bottom steer shaft end may be connected to the axle 104a and the top steer shaft end may be coupled to the steer assembly 118a such that the steer assembly 118a controls rotation of the steer shaft 138a about the steering axis S, which in turn steers the wheel 102a about the steering axis S. The bottom steer shaft end may be mounted to the axle 104a via a casting 152a such that the axle 104a rotates about the steering axis S along with the steer shaft 138a, thus causing the wheel 102a to rotate about the steering axis S. As described in further detail below, the wheel 102a may be tilted with respect to the steering axis S. A more detailed description and discussion of this relationship including a more detailed description the wheel assemblies described herein, may be found in U.S. patent application Ser. No. 15/828,349 titled "DRIVEN CASTER WHEEL AND ASSEMBLY," filed on 30 Nov. 2017, the entirety of which is incorporated herein by reference.

In one example, and as shown in FIGS. 2 and 3, the steer assembly 118a may include a steer motor 144a, steer belt 146a, a steer motor pulley 150a, and steer shaft pulley 148a, the operation of which may be similar to that of the drive assembly 106a. The steer motor 144a may extend substantially vertically. In addition, the steer belt 146a and pulleys 150a, 148a may rotate within a plane that is substantially parallel to and below the plane in which the drive motor 122a, drive belt 124a, and pulleys 126a, 128a rotate. Specifically, the steer shaft pulley 148a that is arranged on the steer shaft 138a may be disposed beneath the drive shaft pulley 128a that is arranged on the drive shaft 108a.

As shown in FIG. 6, the steer shaft 138a may be arranged concentrically with respect to the drive shaft 108a. More particularly, the steer shaft 138a and drive shaft 108a may each extend along the steering axis 5, with the drive shaft 108a being disposed within the steer shaft 138a. As such, the drive shaft 108a may be connected to the axle 104a via the bevel gear 114a, and the steer shaft 138a may be mounted to the axle 104a via a casting 152a that is disposed around the bevel gear 114a.

As shown in FIG. 6, in some embodiments the bevel gear 114a may be configured so that the wheel 102a is tilted with respect to the steering axis S. This tilt may reduce scrubbing action when the wheel 102a turns, and thus improve the durability and steering capabilities of the wheel 102a. For example, the wheel's axis may extend along the length of the wheel, perpendicular to the drive axis D. In this example, the wheel's axis does not extend parallel to the steering axis S, but rather is tilted at an angle relative thereto. As such, while the drive shaft 108a and the steering axis S extend in a substantially vertical direction, the axle 104a and drive axis D may extend in a direction that is not horizontal. In other words, the bevel gear 114a may be configured such that the steering axis S and drive axis D form an angle that is oblique. In some examples, the wheel 102a is tilted at an angle so that when the robotic platform 100 is on a surface the wheel rotates about the steering axis S at a point that is its center of mass. For example, for a wheel and tire configuration having a diameter substantially equal to 16 inches, the bevel gear 114a may be configured so that the angle between the drive axis D and steering axis S is about 110 degrees and the angle between the steering axis S and the wheel is equal to about 20 degrees.

In some embodiments, the tilting suspension system 159 may be configured to tilt each of the right and left platforms 117b, 117c at an angle that is substantially equal to the tilt of its wheel, such that its respective drive axis D is substantially perpendicular to its tilt axis. Thus, the wheels 102a, 102b, 102c may extend substantially straight with respect to the tilt axis. For example, in instances in which the robotic platform 100 rolls linearly along a substantially horizontal surface, rather than tilting, the wheels 102a, 102b, 102c may extend substantially perpendicular to the surface.

As shown in FIGS. 1-5, the platforms 117a, 117b, 117c may be arranged above the wheels 102a, 102b, 102c, and the drive and steer shafts (e.g., drive shaft 108a and steer shaft 138a) may extend from its respective axle (e.g., axle 104a), through the surface of the platforms 117a, 117b, 117c, to a location at or above a top surface of the platforms 117a, 117b, 117c. In addition, the drive and steer assemblies 106a, 106b, 106c, 118a, 118b, 11.8c may be located above the platforms 117a, 117b, 117c and distally from the wheels 102a, 102b, 102c. Thus, with the chassis platforms disposed between the wheels and the drive and steer assemblies, the drive and steer assemblies may be protected from environmental conditions that may surround the wheel.

In some embodiments, each drive belt, steer belt, or tilt belt (e.g., drive belt 124a, steer belt 146a, or tilt belt 164) may be wrapped directly to the circumference of its respective drive shaft, steer shaft, or tilt shaft (e.g., drive shaft 108a, steer shaft 138a, or tilt shaft 174) without a separate pulley component. For example, the bottom portion of the drive motor 122a and/or the top portion of the drive shaft 108a may function as a pulley. Similarly, in some cases each motor (e.g., drive motor 122a, steer motor 144a, tilt motor 162) may be mounted directly to its respective shaft (e.g., drive shaft 108a, steer shaft 138a, tilt shaft 174), thereby eliminating the need for pulleys and belts.

Figure 7:
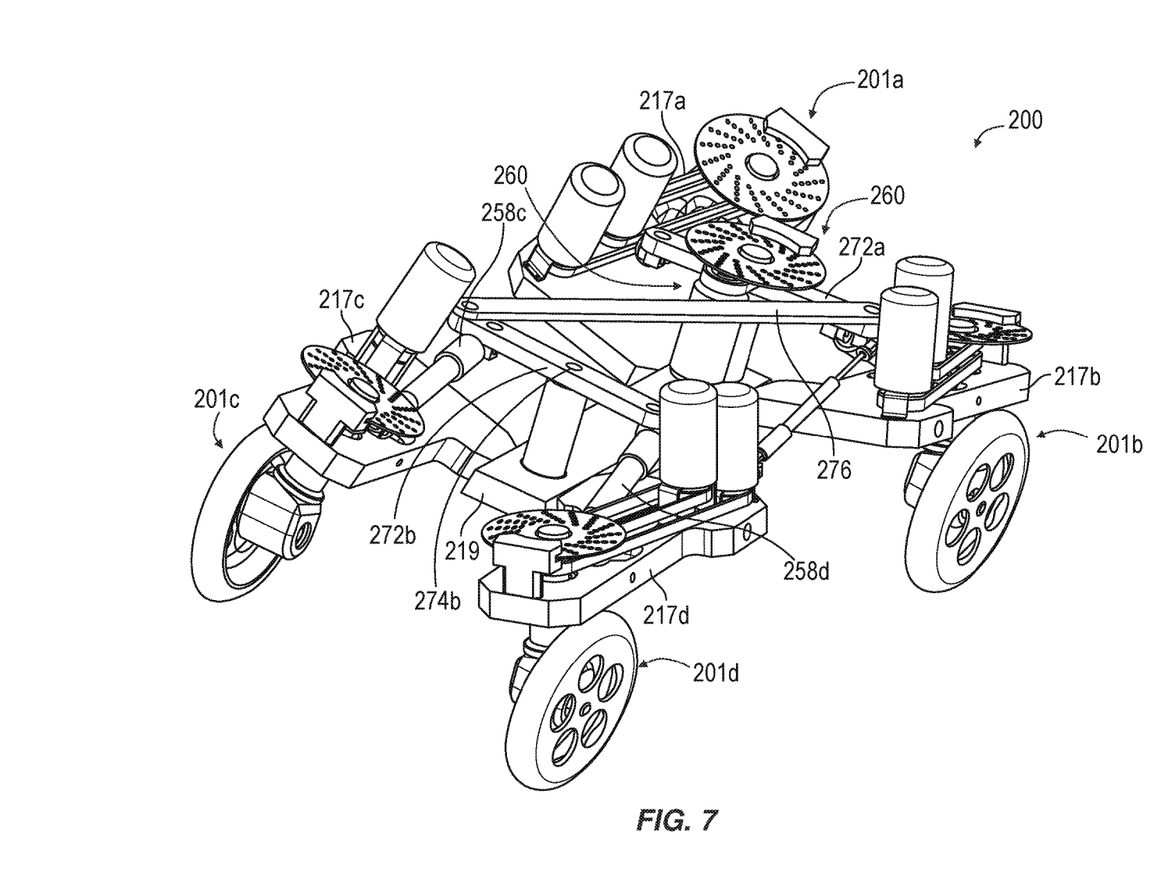
FIG. 7 is a perspective view of a robotic platform according to an additional embodiment.

FIG. 7 is an illustration of an additional robotic platform 200. As shown in this figure, robotic platform 200 may include right- and left-fore platforms 217a, 217b, right- and left-aft platforms 217c, 217d, and a base platform 219. Wheel assemblies 201a-201d may be disposed on the platforms 217a-217d. The wheel assemblies 201a-201d may be driven and steered in a manner similar to the wheel assemblies 101a-101c described above with reference to FIGS. 1-6. A tilting suspension system may include a tilt assembly 260 that is similar to the tilt assembly 160 described above with reference to FIGS. 1-6. A first arm crank 272a may be mounted to the tilt assembly 260 and connected to the right- and left-fore platforms 217a, 217b, via suspension arms, similar to the arm crank 172 configuration described above with reference to FIGS. 1-6. An extension arm 276 may extend from the first arm crank 272a to a second arm crank 272b to translate motion of the first r crank 272a to the second arm crank 272b. The second arm crank 272b may be coupled to right- and left-aft suspension arms 258c, 258d, which may be coupled to respective right- and left-aft platforms 217c, 217d. The second arm crank 272b may be mounted to and rotatable with a second tilt shaft 274b, which may cause movement of the suspension arms 258c, 258d and thus tilting of the right- and left-aft platforms 217c, 217d. Thus, the tilting of all four platforms 217a-217d may be controlled by tilt assembly 260.

The robotic platforms and vehicles described herein may be used in a variety of contexts and/or may be used to support a variety of different types of robots. In one example, these platforms may support an autonomous or semi-autonomous data center robot. In this example, the disclosed platform may enable a robot to move through the aisles of a data center to install, remove, and/or service rack mount units and modules within the data center. Additionally or alternatively, multiple instances of this platform may support a robotic gantry capable of moving among data center aisle and servicing modules within the aisles at various different heights.

As another example, a platform may be used to support a telepresence robot. In this example, the platform may enable the telepresence robot to move from one location to another, to move to the optimal location for interacting with another robot or human, and/or to move in any other suitable manner.

Figure 8:
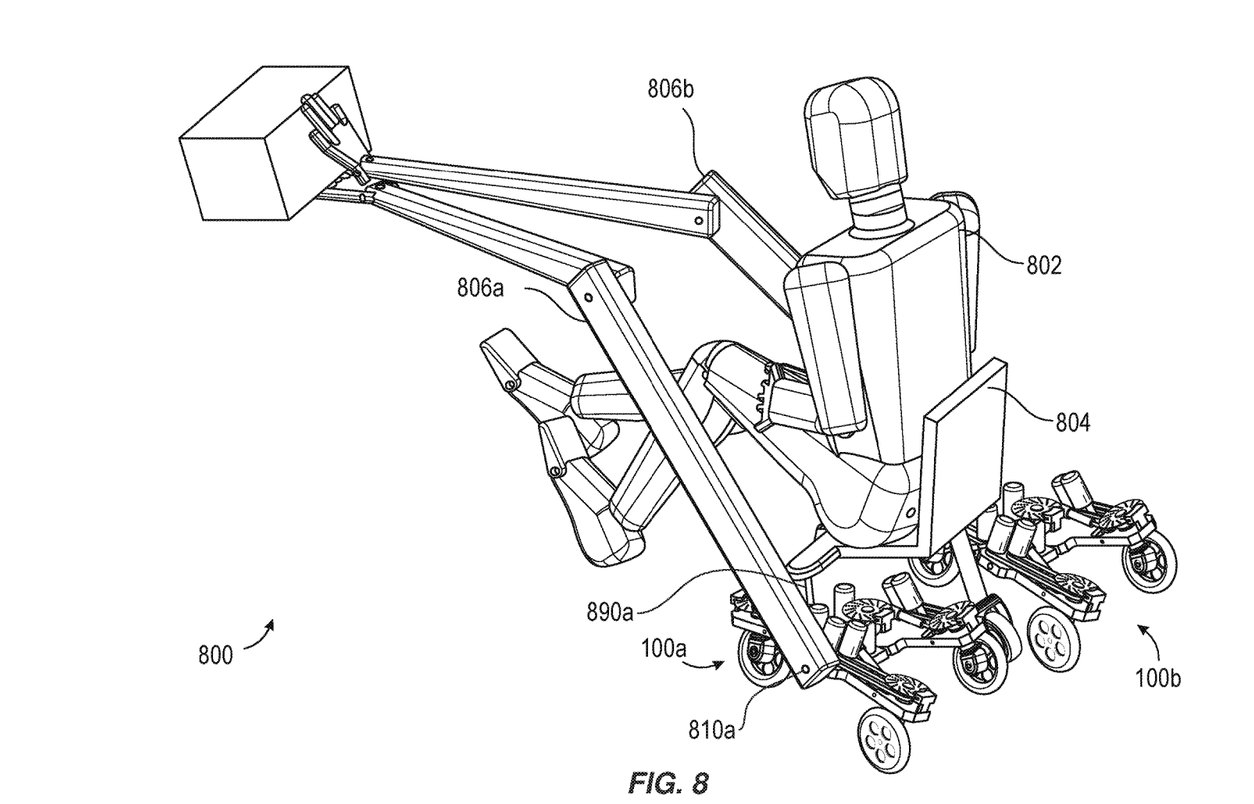
FIG. 8 is a perspective view of two of the robotic platforms from FIG. 1 being used to support an accessibility robot.

A third example is provided in FIG. 8, which shows an accessibility robot 800 mounted on two instances of robotic platform 100, shown as platform 100a and platform 100b. In this example, a chair 804 may be coupled to (1) platform 100a (via a ball joint 890a on platform 100a) and (2) platform 100b (via another ball joint. (not visible in FIG. 8) on platform 100b). Accessibility robot 800 may also include arms 806a and 806b rotatably coupled to platforms 100a and 100b, respectively via arm shafts (e.g., arm shaft 810a). In this example, a user 802 may control arms 806a and 806b via a control interface (e.g., using voice control, using a joystick or control pad etc.) to perform a variety of tasks. Similarly, the user 802 may use a control interface to direct platforms 100a and 100b to move accessibility robot 800 from one location to another.

In this example, the tilting capabilities of platforms 100a and 100b (as detailed above) may, together with the rotational motion of arms 806a and 806b about their respective arm shafts (e.g., arm shaft 810a), enable accessibility robot 800 to effectively simulate the range of motion possessed by a human shoulder. As such, accessibility robot 800 may enable a disabled user or other individual to perform a variety of complicated tasks, such as grasping objects lifting objects, moving objects, etc.

While several distinct examples of using the platforms disclosed herein have been presented, these platforms may be utilized in any other suitable context and/or to support any other suitable type or form of robot. The disclosed robotic platforms and vehicles may provide many advantages. For example, the robotic platform's power assembly (which may include both drive and steer assemblies) may be located entirely outside the circumference of the platform's wheels, thus protecting the power assembly from forceful impacts as well as environmental conditions that may surround the wheels. Similar benefits may be achieved by disposing brake assemblies distally from each wheel. The robotic platform disclosed herein may also allow each wheel to freely rotate 360 degrees about its steering axis without becoming entangled by electrical wires, brake cabling, or other components of the power assembly. Moreover, the disclosed titling suspension system may enable robots and other vehicles to traverse difficult terrain, may dampen the impact of bumps or obstacles, and/or may enable, when combined with other platforms and seating arrangements, disabled individuals to perform complex tasks that mimic the movements of a human shoulder.

The term "wheel," in some examples, generally refers to any suitable type of disc or other object that is rotatable about an axis. Examples of wheels include, without limitation a disc-shaped object that is configured to roll along a surface (e.g., caster wheels) a propeller capable of converting rotational movement to thrust (e.g., to drive a boat through the water), or any other type or form of rotatable object. The robotic platform described herein can have a multitude of applications. For example, the robotic platform may provide an improved (and potentially autonomous) form of transportation for humans. This robotic platform may also be used to support a robot that that is configured to navigate through extreme environmental conditions, perform surgery in a hospital, manage a data center, etc.

The methods and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A robotic platform comprising:
   a chassis comprising at least one left platform, at least one right platform, and at least one base platform;
   a wheel assembly mounted on each of the left and right platforms; and
   a tilting suspension system comprising:
      a tilt shaft coupled to the base platform, the tilt shaft extending from a first tilt shaft end to a second tilt shaft end along a substantially vertical tilt axis;
      an arm crank extending substantially perpendicular to the tilt axis from a left arm crank end to a right arm crank end, wherein the arm crank is coupled to the second tilt shaft end such that the arm crank at least partially rotates about the tilt axis along with the tilt shaft;
      left and right suspension arms coupled to the left and right arm crank ends, respectively, the left and right suspension arms extending from the left and right arm crank ends, respectively, to connect to the left and right platforms, respectively, such that rotation of the arm crank about the tilt axis controls tilt of the left and right platforms relative to the tilt axis; and
      a tilt assembly that controls rotation of the tilt shaft about the tilt axis to control the rotation of the arm crank and the tilt of the left and right platforms.

2. The robotic platform of claim 1, wherein the tilt assembly comprises a tilt motor and a tilt belt that is controlled by the tilt motor, wherein the tilt shaft is wrapped by the tilt belt such that rotation of the tilt belt controls rotation of the tilt shaft about the tilt axis.

3. The robotic platform of claim 1, further comprising a tilt brake arranged on the second tilt shaft end and dimensioned to retard motion of the tilt shaft and thereby retard motion of the arm crank and the left and right suspension arms.

4. The robotic platform of claim 3, wherein the tilt brake comprises a disc brake, the disc brake comprising:
   a disc disposed on the tilt shaft and configured to rotate with the tilt shaft about the tilt axis; and
   a pair of pads on top and bottom sides of the disc, wherein the pads are compressible against the disc to retard rotation of the disc and thereby retard rotation of the tilt shaft.

5. The robotic platform of claim 1, further comprising a drive assembly disposed on each of the left and right platforms, the drive assembly comprising a drive motor and a drive belt that is controlled by the drive motor.

6. The robotic platform of claim 5, wherein the wheel assembly comprises:
   a wheel mounted to an axle for rotation about a drive axis and steering about a substantially vertical steering axis;
   a drive shaft extending along the steering axis from a first drive shaft end to a second drive shaft end, the first drive shaft end being coupled to the axle and the second drive shalt end being wrapped by the drive belt of the drive motor such that the drive belt controls rotation of the drive shaft about the steering axis; and
   a bevel gear connecting the first drive shaft end to the axle such that rotation of the drive shalt about the steering axis controls rotation of the wheel about the drive axis to drive the robotic platform in a substantially horizontal direction.

7. The robotic platform of claim 6, further comprising a steer assembly disposed on each of the left and right platforms, the steer assembly comprising a steer motor and a steer belt, wherein the wheel assembly includes a steer shaft extending along the steering axis from a first steer shaft end to a second steer shaft end, the first steer shaft end being coupled to the axle and the second steer shaft end being wrapped by the steer belt such that the steer belt controls rotation of the steer shaft about the steering axis to steer the wheel about the steering axis.

8. The robotic platform of claim 6, further comprising a brake arranged on the second drive shaft end of the drive shaft and dimensioned to retard motion of the drive shaft and thereby retard motion of the wheel.

9. The robotic platform of claim 8, wherein the brake comprises a disc brake, the disc brake comprising:
   a disc disposed on the drive shaft and configured to rotate with the drive shaft about the steering axis; and
   a pair of pads on top and bottom sides of the disc, wherein the pads are compressible against the disc to retard rotation of the disc and thereby retard rotation of the drive shaft.

10. The robotic platform of claim 6, wherein the drive axis and the steering axis together form an oblique angle such that the wheel is tilted relative to the drive shaft.

11. The robotic platform of claim 6, wherein the tilt assembly is configured to tilt each of the left and right platforms at an angle that is substantially equal to the tilt of the wheel such that the drive axis is substantially perpendicular to the tilt axis.

12. The robotic platform of claim 6, wherein the wheel is configured to freely rotate 360 degrees about the steering axis.

13. The robotic platform of claim 1, further comprising:
    a drive assembly disposed on the base platform, the drive assembly comprising a base drive motor and a base drive belt; and
    a base driven wheel assembly mounted on the base platform, the base driven wheel assembly comprising:
       a wheel mounted to an axle for rotation about a drive axis and steering about a substantially vertical steering axis;
       a drive shaft extending along the steering axis from a first drive shaft end to a second drive shaft end, the first drive shaft end being coupled to the axle and the second drive shaft end being wrapped by the base drive belt such that the base drive belt controls rotation of the drive shaft about the steering axis; and a bevel gear connecting the first drive shaft end to the axle such that rotation of the drive shaft about the steering axis controls rotation of the wheel about the drive axis to drive the robotic platform in a substantially horizontal direction.

14. A vehicle comprising:
a chassis comprising at least one left platform, at least one right platform, and at least one base platform;
a wheel assembly mounted on each of the left and right platforms; and
a tilting suspension system comprising:
   a tilt shaft coupled to the base platform, the tilt shaft extending from a first tilt shaft end to a second tilt shaft end along a substantially vertical tilt axis;
   an arm crank extending substantially perpendicular to the tilt axis from a left arm crank end to a right arm crank end, wherein the arm crank is coupled to the second tilt shaft end such that the arm crank at least partially rotates about the tilt axis along with the tilt shaft;
   left and right suspension arms coupled to the left and right arm crank ends, respectively, the left and right suspension arms extending from the left and right arm crank ends, respectively, to connect to the left and right platforms, respectively, such that rotation of the arm crank about the tilt axis controls tilt of the left and right platforms relative to the tilt axis; and
   a tilt assembly that controls rotation of the tilt shaft about the tilt axis to control the rotation of the arm crank and the tilt of the left and right platforms.

15. The vehicle of claim 14, wherein the tilt assembly comprises a tilt motor and a tilt belt that is controlled by the tilt motor, wherein the tilt shaft is wrapped by the tilt belt such that rotation of the tilt belt controls rotation of the tilt shaft about the tilt axis.

16. The vehicle of claim 14, further comprising a drive assembly disposed on each of the left and right platforms, the drive assembly comprising a drive motor and a drive belt that is controlled by the drive motor, wherein the wheel assembly comprises:
   a wheel mounted to an axle for rotation about a drive axis and steering about a substantially vertical steering axis;
   a drive shaft extending along the steering axis from a first drive shaft end to a second drive shaft end, the first drive shaft end being coupled to the axle and the second drive shaft end being wrapped by the drive heft such that the drive belt controls rotation of the drive shaft about the steering axis; and
   a bevel gear connecting the first drive shaft end to the axle such that rotation of the drive shaft about the steering axis controls rotation of the wheel about the drive axis to drive the vehicle in a substantially horizontal direction.

17. The vehicle of claim 14, further comprising a tilt disc brake arranged on the second tilt shaft end of the tilt shaft and dimensioned to retard motion of the tilt shaft and thereby retard motion of the arm crank and the left and right suspension arms, the tilt disc brake comprising:
   a disc disposed on the tilt shaft and configured to rotate with the tilt shaft about the tilt axis; and
   a pair of pads on top and bottom sides of the disc, wherein the pads are compressible against the disc to retard rotation of the disc and thereby retard rotation of the tilt shaft.

18. The vehicle of claim 14, further comprising:
a second left platform and a second right platform, wherein the wheel assembly is mounted on each of the second left and second right platforms, the left and right platforms are disposed proximate a fore end of the base platform, and the second left and second right platforms are disposed proximate an aft end of the base platform;
a second tilting suspension system comprising:
   a second tilt shaft having a second tilt shaft bottom end coupled to the base platform and extending from the second tilt shaft bottom end to a second tilt shaft top end along a second substantially vertical tilt axis;
   a second arm crank extending substantially perpendicular to the second tilt axis from a left end to a right end of the second arm crank wherein the second arm crank is coupled to the second tilt shaft top end such that the second arm crank at least partially rotates about the second tilt axis along with the second tilt shaft;
   left and right second suspension arms coupled to the left and right ends of the second arm crank respectively, the left and right second suspension arms extending from the left and right ends of the second arm crank, respectively, to connect to the second left and second right platforms respectively, such that rotation of the second arm crank about the second tilt axis controls tilt of the second left and second right platforms relative to the second tilt axis; and
   an extension arm that couples the arm crank to the second arm crank such that rotation of the arm crank about the tilt shaft controls rotation of the second arm crank about the second tilt shaft to control the rotation of the second arm crank and the tilt of the second left and second right platforms.

19. A robotic platform comprising:
a chassis comprising a left-fore platform, a right-fore platform, a left-aft platform, a right-aft platform, and a base platform;
a wheel assembly mounted on each of the left-fore, right-fore, left-aft, and right-aft platforms; and
a tilting suspension system comprising:
   fore and aft tilt shafts mounted to fore and aft ends of the base platform, respectively, wherein each of the fore and aft tilt shafts extends from a first tilt shaft end to a second tilt shaft end along a substantially vertical tilt axis;
   fore and aft arm cranks coupled to the second tilt shaft end of the fore and aft tilt shafts, respectively, such that, for each arm crank, the arm crank at least partially rotates about the tilt axis and the arm crank extends substantially perpendicular to the tilt axis from a left arm crank end to a right arm crank end; and
   for each of the fore and aft arm cranks, left and right suspension arms connected to the left and right arm crank ends, respectively, wherein:
      the left and right suspension arms connected to the fore arm crank are coupled to the left-fore and right-fore platforms, respectively, such that rotation of the fore arm crank along with the fore tilt shaft controls tilt of the left-fore and right-fore platforms relative to the tilt axis of the fore tilt shaft;

the left and right suspension arms connected to the aft arm crank are coupled to the left-aft and right-aft platforms, respectively, such that rotation of the aft arm crank along with the aft tilt shaft controls tilt of the left-aft and right-aft platforms relative to the tilt axis of the aft tilt shaft;

a tilt assembly comprising a tilt motor and a tilt belt that is controlled by the tilt motor, wherein the fore tilt shaft is wrapped by the tilt belt such that rotation of the tilt belt controls rotation of the fore tilt shaft to control the tilt of the left-fore and right-fore platforms; and an extension arm that couples the fore arm crank to the aft arm crank such that rotation of the fore arm crank about the fore tilt shaft controls rotation of the aft arm crank about the aft tilt shaft to control the tilt of the left-aft and right-aft platforms.

20. The robotic platform of claim 19, further comprising a drive assembly disposed on each of the left-fore, right-fore, left-aft, and right-aft platforms, the drive assembly comprising a drive motor and a drive belt that is controlled by the drive motor, wherein the wheel assembly comprises:

a wheel mounted to an axle for rotation about a drive axis and steering about a substantially vertical steering axis;

a drive shaft extending along the steering axis from a first drive shaft end to a second drive shaft end, the first drive shaft end being coupled to the axle and the second drive shaft end being wrapped by the drive belt such that the drive belt controls rotation of the drive shaft about the steering axis; and a bevel gear connecting the first drive shaft end to the axle such that rotation of the drive shaft about the steering axis controls rotation of the wheel about the drive axis to drive the robotic platform in a substantially horizontal direction.

* * * * *

UNITED STATES PATENT AND TRADEMARK OFFICE
CERTIFICATE OF CORRECTION

PATENT NO. : 10,421,326 B2
APPLICATION NO. : 15/828365
DATED : September 24, 2019
INVENTOR(S) : Scott C. Wiley et al.

It is certified that error appears in the above-identified patent and that said Letters Patent is hereby corrected as shown below:

In the Claims

In Column 14, Line 16, Claim 6, delete "shalt" and insert -- shaft --, therefor.

In Column 14, Line 20, Claim 6, delete "shalt" and insert -- shaft --, therefor.

In Column 15, Line 52, Claim 16, delete "heft" and insert -- belt --, therefor.

In Column 16, Line 21, Claim 18, delete "crank" and insert -- crank, --, therefor.

In Column 16, Line 27, Claim 18, delete "crank" and insert -- crank, --, therefor.

In Column 16, Line 31, Claim 18, delete "platforms" and insert -- platforms, --, therefor.

Signed and Sealed this
Nineteenth Day of November, 2019

Andrei Iancu
*Director of the United States Patent and Trademark Office*